UNITED STATES PATENT OFFICE.

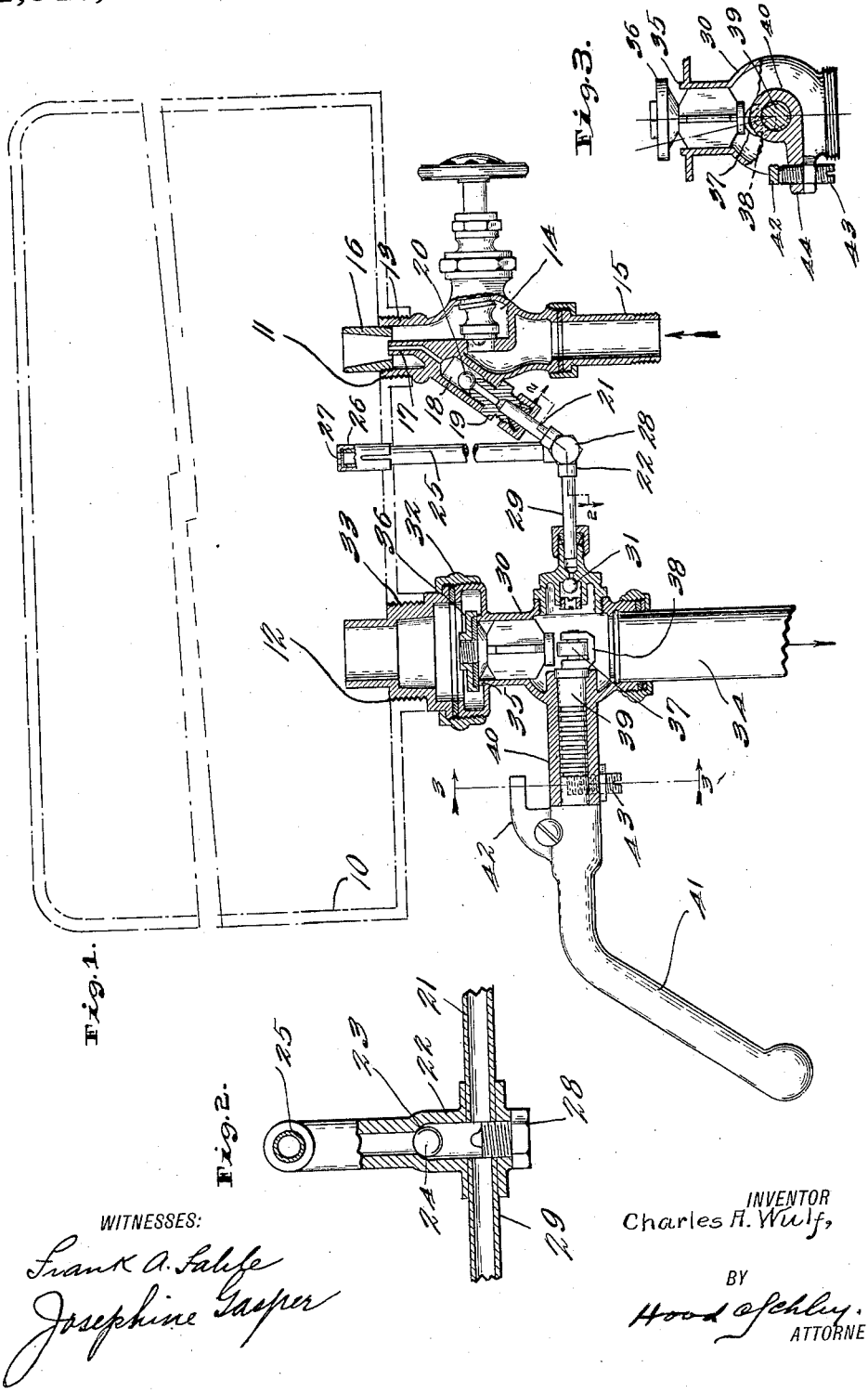
C. A. WULF.
FLUSHING SYSTEM.
APPLICATION FILED DEC. 28, 1917.
1,346,362.
Patented July 13, 1920.
INVENTOR
Charles A. Wulf,

CHARLES A. WULF, OF INDIANAPOLIS, INDIANA.

FLUSHING SYSTEM.

1,346,362.  Specification of Letters Patent. Patented July 13, 1920.

Application filed December 28, 1917. Serial No. 209,244.

*To all whom it may concern:*

Be it known that I, CHARLES A. WULF, a citizen of the United States, residing at Indianapolis, in the county of Marion and State of Indiana, have invented a new and useful Flushing System, of which the following is a specification.

My present invention relates to the type of closet-flushing systems shown in my prior Patents No. 966,509, August 9, 1910, and No. 1,083,974, January 13, 1914.

It is the object of my present invention to introduce certain refinements over the devices shown in such prior patents, to simplify the construction so that the device may be put together more easily, to obtain an easy accessibility of the parts, as for repairs, to eliminate noise, to introduce sanitary features, and to provide a simple adjustment whereby the amount of water discharged may be readily and effectively controlled.

The accompanying drawing illustrates my invention. Figure 1 is a sectional view through the various valves of my improved system, showing an outlet of the associated tank; Fig. 2 is an enlarged section on the line 2—2 of Fig. 1; and Fig. 3 is a section on the line 3—3 of Fig. 1, with the flushing valve open.

The tank 10 is an air-tight tank, having an inlet 11 and a larger outlet 12. In the inlet is screwed the upper threaded end 13 of a supply valve 14, the lower end of which is connected by any suitable fitting 15 to the water supply source. A smaller flaring tube 16 has a screw-threaded mounting in the upper end of the threaded end 13 of the valve 14, and preferably projects up into the tank 10; and discharging upward within this smaller flaring tube 16 is an air nozzle 17 having an oblique inlet passage 18 in the inlet end of which is mounted a perforated plug 19 the inner end of which forms a seat for a ball valve 20 so as to provide a check valve which permits air to pass into the nozzle 17 but prevents water from passing out through the passage 18. The nozzle 17 and passage 18 of this air injector are formed as integral parts of the casing of the valve 14. A pipe 21 is suitably connected to the plug 19 and to a fitting 22 which is provided with a seat 23 for a ball valve 24. This ball valve acts as a check valve to permit inflow of air through a vertical air intake pipe 25, while preventing backward flow through such pipe. The upper end of the pipe 25 is the inlet end, and is provided with a perforated cap 26 which clamps in place a felt washer 27 which is sufficiently pervious to allow the passage of air into the pipe 25 but eliminates whistling. A removable screw plug 28 gives access to the ball valve 24, and also prevents it from closing the end of the pipe 21 or of a pipe 29 which is also connected to the fitting 22. The pipe 29 communicates with a lateral opening of the discharge valve fitting 30, in which lateral opening there is a check valve 31 which permits fluid flow from the pipe 29 into the valve fitting 30 while preventing it in the opposite direction. This allows any water which may leak past the valve 20 to pass on to the drainage connection, but prevents any air from passing from the valve fitting 30 through the pipe 29 into the pipe 21, so that whatever air passes into the pipe 21 must be through the air intake pipe 25. The seating of the valve 31 is insured by the partial vacuum produced in the pipes 21, 25, and 29 on account of the resistance offered by the felt 27 to the entrance of air into the pipe 25. The upper end of the valve fitting 30 is connected by a suitable union 32 to a fitting 33 mounted in the outlet 12 and preferably projecting upward into the tank 10, and the lower end of such valve fitting 30 is connected to the flushing pipe 34 leading to the associated water closet bowl. In the upper end of the valve fitting 30 is formed a seat 35 for the flushing valve 36, which may be raised from its seat by the action of a roller 37 carried eccentrically by a crank arm 38 on the end of a rock shaft 39 mounted in a lateral extension 40 of the valve fitting 30. At its outer end, the rock shaft 39 is provided with a down-turned crank portion 41 which forms an operating handle, so that by lifting it the roller 37 is caused to lift the valve 36. The amount of turning movement of the rock shaft 39 is limited by the engagement of a lateral finger 42 on such shaft and a screw 43 mounted in a lateral projection 44 from the extension 40, the adjustment being such that the arm 38 is allowed to go an adjustable distance beyond dead center so that the rock shaft 39 is not turned back by the weight of the operating crank 41 until enough water has passed through the valve fitting 30 so as to relieve the downward pressure of the water on the valve 36 and thus allow it to move up slightly so that the arm 38 may pass to allow the rock shaft 39 to return to normal position.

In operation, the valve 14 being open, water is discharged through the inlet 11 into the tank 10 to compress the air in the upper part thereof until the pressure of the air balances the pressure of the incoming water. The flow of the incoming water through the smaller flaring tube 16 causes air to be drawn in through the nozzle 17, to supply the loss which is caused by the absorption of the air in the water, which loss without such replenishing would eventually cause the system to become "air-bound". This air is drawn in through the felt 27, which prevents whistling, the pipe 25, the fitting 22, past the check valve 24, and through the pipe 21 and plug 19 past the check valve 20 into the passageway 18 leading to the nozzle 17. The check valve 31 prevents any air from being drawn in from the discharge valve fitting 30 and the associated closet bowl, which might be objectionable from a sanitary standpoint. The felt 27 offers some resistance to the entrance of air, so that upon suction of air from the nozzle 17 a partial vacuum is produced in the pipes 21, 25, and 29; this renders certain the seating of the valve 31, at this time, to prevent the drawing in of air from the pipe 34.

The ball 20 seats itself on the inner end of the plug 19 when the inflow of water to the tank 10 ceases, thus preventing any of the water from flowing out through the nozzle 17 and its connections. However, should there be any leakage past the check valve 20, it is led to the discharge valve fitting 30 whence it passes to the closet bowl and is drained away, the valve 31 permitting this, while the valve 24 prevents the water from passing into the air intake pipe 25.

When it is desired to obtain a flushing action, the handle 41 is lifted to turn the rock shaft 39 and raise the valve 36, to allow the water in the tank 10 to be forced out by the pressure of the pocketed air. The outflow of water continues until the water pressure on the top of the valve 36 is sufficiently lowered to allow the weight of the handle 41 to raise the valve 36 slightly so that the arm 38 may pass through the dead center position. The amount of water discharged may thus be adjusted by the screw 43. This screw will be adjusted according to the water pressure, for more water enters the tank 10 under high pressure than under low pressure, and therefore to get a given quantity of water discharge the discharge valve may be closed sooner with high pressure. In consequence, the screw 43 will be adjusted to hold the arm 38 more closely to the dead center position for high water pressure than at low water pressure. Inflow of water into the tank through the inlet 11 starts directly after the outflow of water from the outlet 12 begins, but because the outlet passage is larger than the inlet passage the outflow is more rapid than the inflow so that the desired rapid flushing may be obtained, and so that the aforesaid reduction in pressure on top of the valve 36 takes place to permit such valve to close and stop the outflow, the inflow continuing thereafter until the air in the tank 10 is sufficiently compressed to balance the water pressure. By having the air injector formed as an integral part of the valve 14, assembling of the device is considerably facilitated. By having the valve 36 separate from the arm 38 and roller 37, such valve may be more readily removed for inspection and repair for it can be lifted out of the discharge valve fitting 30 without hindrance from the rock shaft 39 and its associated parts. The upward projection of the smaller flaring tube 16 and the fitting 33 above the bottom of the tank 10 prevents the settlement of sediment in the inlet and discharge valves.

I claim as my invention:

1. A flushing system, comprising an airtight tank having a water-supply inlet and a valved discharge outlet, an air injector associated with said water-supply inlet, said air injector having a restricted air inlet opening and a separate opening to the valved discharge outlet on the discharge side of the valve thereof, and a check valve associated with said separate opening for permitting outflow of fluid to the valved discharge outlet and preventing inflow of fluid from such valved discharge outlet.

2. A flushing system, comprising an airtight tank having a water-supply inlet and a valved discharge outlet, an air injector associated with said water-supply inlet, said air injector having an air inlet connection which is provided with a check valve permitting air inflow to the injector and has an opening to atmosphere and a separate opening to the valved discharge outlet on the discharge side of the valve thereof, and check valves associated with said openings for permitting only fluid inflow through the first and only fluid outflow through the second.

3. A flushing system, comprising an airtight tank having a water-supply inlet and a valved discharge outlet, an air injector associated with said water-supply inlet, said air injector having an air inlet connection which is provided with a check valve permitting air inflow to the injector and has an opening to atmosphere and a separate opening to a drainage connection, and check valves associated with said openings for permitting only fluid inflow through the first and only fluid outflow through the second.

4. A flushing system, comprising an airtight tank having a water-supply inlet and a flushing discharge outlet, a valve controlling said outlet and forced to its seat by the pressure from the tank, said valve being separable from said tank, a rock shaft having a crank arm for lifting said valve from its seat, said crank arm and the movable element of the valve being separate so that after the valve is separated from the tank its movable element may be lifted out without interference from the crank arm.

5. A flushing system, comprising an airtight tank having a water-supply inlet and a flushing discharge outlet, a valve controlling said outlet and forced to its seat by the pressure from the tank, a rock shaft having a crank arm for lifting said valve from its seat, said rock shaft having a tendency to move to a position where it permits the valve to close, and adjustable means for limiting the valve-opening turning of said rock shaft to vary the amount said crank arm passes dead center when lifting said valve and thereby controlling the tank water pressure at which the pressure of the valve on said crank arm permits the rock shaft to swing back to normal position to allow the valve to close.

6. A flushing system, comprising an airtight tank having a water-supply inlet and a flushing discharge outlet, a valve controlling said outlet and forced to its seat by the pressure from the tank, a rock shaft having a crank arm for lifting said valve from its seat, said rock shaft being provided with an operating handle crank which by its weight tends to return the rock shaft to a position permitting the valve to close, and adjustable means for limiting the valve-opening turning of said rock shaft to vary the amount said crank arm passes dead center when lifting said valve and thereby controlling the tank water pressure at which the pressure of the valve on said crank arm permits the weight of the handle crank to swing the rock shaft back to normal position to allow the valve to close.

In witness whereof I have hereunto set my hand at Fairmont, West Virginia, this 19th day of December, A. D. one thousand nine hundred and seventeen.

CHARLES A. WULF.